(12) United States Patent
Wang et al.

(10) Patent No.: US 9,810,190 B2
(45) Date of Patent: Nov. 7, 2017

(54) METHOD AND APPARATUS FOR EXECUTING ENGINE AUTOSTART IN A POWERTRAIN SYSTEM EMPLOYING MULTIPLE TORQUE GENERATING DEVICES

(71) Applicant: GM GLOBAL TECHNOLOGY OPERATIONS LLC, Detroit, MI (US)

(72) Inventors: Meng Wang, Novi, MI (US); Anthony Christman, Madison Heights, MI (US); Poh Fong Chin, Novi, MI (US); John Janczak, Commerce Township, MI (US); Anthony H. Heap, Ann Arbor, MI (US); Kee Yong Kim, Ann Arbor, MI (US); Bryan J. Morton, Saline, MI (US); Goro Tamai, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 133 days.

(21) Appl. No.: 14/694,529

(22) Filed: Apr. 23, 2015

(65) Prior Publication Data
US 2016/0312754 A1    Oct. 27, 2016

(51) Int. Cl.
| | |
|---|---|
| *F02N 11/08* | (2006.01) |
| *F02D 29/02* | (2006.01) |
| *B60W 10/26* | (2006.01) |
| *B60W 10/06* | (2006.01) |

(Continued)

(52) U.S. Cl.
CPC ......... *F02N 11/0803* (2013.01); *B60W 10/06* (2013.01); *B60W 10/26* (2013.01); *B60W 20/13* (2016.01); *B60W 20/50* (2013.01); *F02D 29/02* (2013.01); *B60W 2400/00* (2013.01); *B60W 2510/0657* (2013.01); *B60W 2510/244* (2013.01); *B60W 2710/06* (2013.01); *F02D 2200/1002* (2013.01); *F02D 2250/21* (2013.01);

(Continued)

(58) Field of Classification Search
CPC ...... B60W 20/40; B60W 20/19; B60W 20/50; B60W 10/26; B60W 20/13; B60W 10/06; B60W 2510/0657; B60W 2400/00; B60W 2710/06; B60W 2510/244; F02N 11/0803; F02D 29/02; F02D 2250/21; F02D 2250/26; F02D 2200/1002; Y10S 903/93; Y10S 903/905

See application file for complete search history.

(56) References Cited

U.S. PATENT DOCUMENTS

| | | | |
|---|---|---|---|
| 9,005,077 B2 * | 4/2015 | Kim ......................... | B60K 6/52 180/65.28 |
| 9,381,911 B2 * | 7/2016 | Aldrich, III ........... | B60K 6/485 |

(Continued)

*Primary Examiner* — Rami Khatib
*Assistant Examiner* — Jeffrey Boomer
(74) *Attorney, Agent, or Firm* — Quinn IP Law

(57) ABSTRACT

A powertrain system is described, and includes an internal combustion engine and an electric machine configured to generate propulsion torque responsive to a driver torque request. A method for operating the powertrain system includes determining, in response to a request to execute an engine autostart operation, whether a driveline torque sag may occur. The method further includes forgoing executing the engine autostart operation when it is determined that a driveline torque sag will occur during the execution of the engine autostart operation.

18 Claims, 2 Drawing Sheets

(51) Int. Cl.
  *B60W 20/50* (2016.01)
  *B60W 20/13* (2016.01)
(52) U.S. Cl.
  CPC ....... *F02D 2250/26* (2013.01); *Y10S 903/905* (2013.01); *Y10S 903/93* (2013.01)

(56) References Cited

U.S. PATENT DOCUMENTS

| | | | | | |
|---|---|---|---|---|---|
| 2006/0150937 | A1* | 7/2006 | Lupo | ................... | F02D 41/042 123/179.4 |
| 2007/0278021 | A1* | 12/2007 | Pott | ................... | B60K 6/48 180/65.285 |
| 2009/0271088 | A1* | 10/2009 | Langham | ................... | F01B 11/004 701/102 |
| 2010/0038158 | A1* | 2/2010 | Whitney | ................... | B60K 6/365 180/65.265 |
| 2010/0211242 | A1* | 8/2010 | Kelty | ................... | B60K 6/46 701/22 |
| 2012/0309585 | A1* | 12/2012 | Whitney | ................... | B60K 6/48 477/5 |
| 2012/0310455 | A1* | 12/2012 | Arnett | ................... | B60W 20/00 701/22 |
| 2013/0030633 | A1* | 1/2013 | Yamamoto | ................... | B60W 10/08 701/22 |
| 2013/0035839 | A1* | 2/2013 | Otanez | ................... | F02N 11/0837 701/102 |
| 2013/0066494 | A1* | 3/2013 | Kamijo | ................... | F02N 11/0844 701/22 |
| 2013/0158766 | A1* | 6/2013 | Okuda | ................... | B60K 6/48 701/22 |
| 2013/0211654 | A1* | 8/2013 | Tanisshima | ................... | B60K 6/48 701/22 |
| 2014/0024495 | A1* | 1/2014 | Kim | ................... | B60K 6/52 477/167 |
| 2014/0350803 | A1* | 11/2014 | Ye | ................... | B60W 20/10 701/51 |
| 2014/0371983 | A1* | 12/2014 | Miyashita | ................... | B60L 1/003 701/36 |
| 2015/0065297 | A1* | 3/2015 | Hoshiba | ................... | B60W 20/10 477/19 |
| 2015/0096518 | A1* | 4/2015 | Creviston | ................... | F02N 11/04 123/179.4 |
| 2015/0149009 | A1* | 5/2015 | Michikoshi | ................... | B60K 6/48 701/22 |
| 2015/0217761 | A1* | 8/2015 | Christman | ................... | B60W 20/40 701/22 |
| 2015/0246670 | A1* | 9/2015 | Ideshio | ................... | B60K 6/48 477/5 |
| 2015/0360673 | A1* | 12/2015 | Yoshida | ................... | B60W 10/06 477/5 |
| 2016/0114787 | A1* | 4/2016 | Yang | ................... | B60W 10/113 701/22 |
| 2016/0280205 | A1* | 9/2016 | Nefcy | ................... | B60W 20/13 |

\* cited by examiner

METHOD AND APPARATUS FOR EXECUTING ENGINE AUTOSTART IN A POWERTRAIN SYSTEM EMPLOYING MULTIPLE TORQUE GENERATING DEVICES

TECHNICAL FIELD

This disclosure relates to powertrain systems employing multiple torque-generating devices and dynamic system controls associated therewith.

BACKGROUND

Hybrid powertrain systems generate propulsion torque from two or more energy sources, e.g., hydrocarbon-based fuels through an internal combustion engine, and electric power through one or more electric machines, with the propulsion torque transferred through a torque transmission device to an output member coupled to a driveline. Such powertrain systems may employ either or both a charge-depleting mode and a charge-sustaining mode, wherein such strategies refer to managing a state of charge (SOC) of an energy storage system for the electric machines. In a charge-depleting mode, a powertrain control system controls powertrain operation such that the SOC of the energy storage system achieves a minimum state during a vehicle trip, or key-on cycle, and manages torque from the internal combustion engine and torque from the electric machine(s) based thereon. In a charge-sustaining mode, a powertrain control system controls powertrain operation such that the SOC of the energy storage system is at the same level at the end of a vehicle trip as it was at the beginning of the vehicle trip, and manages torque from the internal combustion engine and torque from the electric machine(s) based thereon.

Control systems for operating hybrid powertrain systems control torque outputs of the engine and electric machine(s) and apply torque transfer elements in the transmission to transfer torque in response to operator-commanded output torque requests, taking into account fuel economy, emissions, drivability, and other factors. A control system monitors various inputs from the vehicle and the operator and provides operational control of the hybrid powertrain, including controlling transmission operating mode and gear shifting, controlling torque outputs from the engine and electric machine(s), and regulating the electrical power interchange among the electrical energy storage device and the electric machines to manage outputs of the transmission, including torque and rotational speed.

SUMMARY

A powertrain system is described, and includes an internal combustion engine and an electric machine configured to generate propulsion torque responsive to a driver torque request. A method for operating the powertrain system includes determining, in response to a request to execute an engine autostart operation, whether a driveline torque sag may occur. The method further includes forgoing executing the engine autostart operation when it is determined that a driveline torque sag will occur during the execution of the engine autostart operation.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
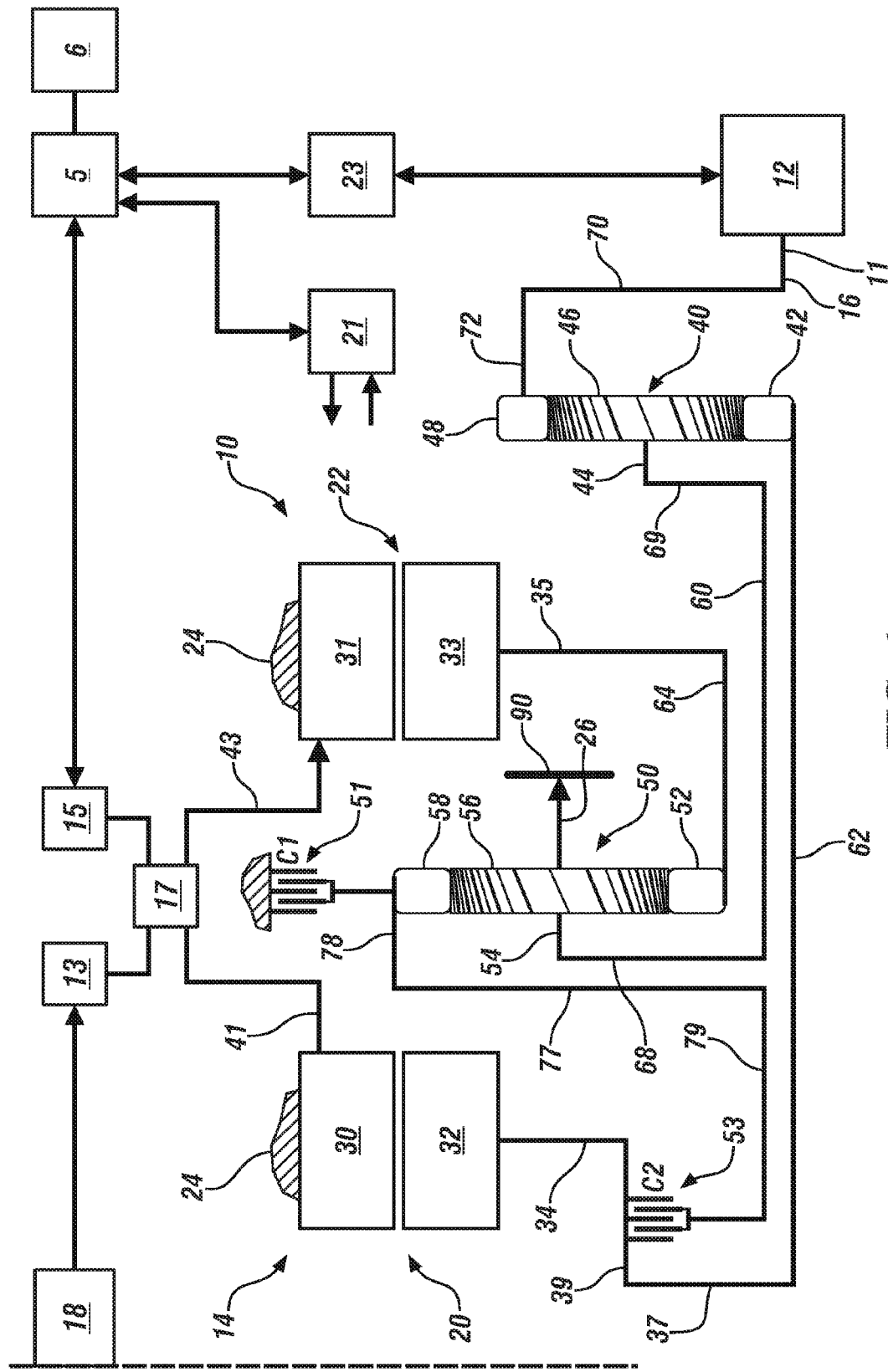
FIG. 1 schematically illustrates a powertrain system that includes an internal combustion engine and a multi-mode transmission that couples to a driveline, the operation of which is controlled by a hybrid control module, in accordance with the disclosure.

Referring now to the drawings, wherein the showings are for the purpose of illustrating certain exemplary embodiments only and not for the purpose of limiting the same, FIG. 1 schematically illustrates elements of a hybrid powertrain system 10 for a vehicle including an internal combustion engine (engine) 12 and first and second electric machines 20, 22, respectively, that mechanically couple to a multi-mode transmission (transmission) 14 to transfer torque therebetween. An output member 26 of the transmission 14 mechanically couples to a driveline 90 that may include gear multipliers, differentials, transaxles and/or other torque transfer elements. The hybrid powertrain system 10 generates an output torque, which the driveline 90 transfers to vehicle wheels in the form of a propulsion torque. The output torque and the propulsion torque may be either a positive torque for vehicle acceleration or a negative torque for vehicle deceleration, i.e., for braking. Power generated by the engine 12 originates from stored energy in the form of hydrocarbon fuel, and may provide torque for vehicle propulsion and/or provide input power to one or both of the first and second electric machines 20, 22 operating in an electric power generating (charging) mode. Power generated by the first and second electric machines 20, 22 originates from electrical energy stored in a high-voltage energy storage device (battery) 13, or from the engine 12. In one embodiment, the battery 13 may couple via a charger 18 to an off-vehicle electric power supply to effect charging of the battery 13 during periods when the vehicle is parked. Such a system may be referred to as a plug-in hybrid vehicle.

The engine 12 and the first and second electric machines 20, 22 may be described in terms of a maximum output power capability, with the output power being in the form of either mechanical torque or electric power. One or both the first and second electric machines 20, 22 may be employed to generate torque for vehicle propulsion. In one embodiment, the first electric machine 20 functions primarily to generate electric power and the second electric machine 22 functions primarily to generate torque for vehicle propulsion. In one embodiment, the second electric machine 22 may be configured with a maximum output power that is greater than the maximum output power of the engine 12. In such embodiments, the second electric machine 22 operates as a primary mover for providing the torque for vehicle propulsion and the engine 12 functions in a supplementary role of providing torque for electric power generation through the first electric machine 20 and/or providing torque for vehicle propulsion.

The operations of the various elements of the powertrain system 10 are dynamically controlled by a hybrid control module (HCP)5. The powertrain system 10 is illustrative of one embodiment on which the concepts described herein may be employed. It is appreciated that the concepts described herein may be employed on any embodiment of a hybrid powertrain system that includes an internal combustion engine that mechanically couples to at least one electric machine to generate torque for vehicle propulsion and electric power for storage on an energy storage device, The engine 12 includes a rotating crankshaft 11 that rotatably couples to an input member 16 of the transmission 14. The rotating crankshaft 11 couples to the input member 16 of the transmission 14 such that rotation of the crankshaft 11 causes a corresponding rotation of the input member 16. The crankshaft 11 may couple to the input member 16 through an intervening clutch, torque converter device or other device that is capable of decoupling rotation of the engine crankshaft 11 from the corresponding rotation of the input member 16 of the transmission 14. The engine 12 is configured for autostop and autostart operations during key-on operation of the vehicle. The autostop operation includes commanding the engine 12 to an OFF state during the key-on operation, with all torque for vehicle propulsion provided via one or both of the first and second electric machines 20, 22 in response to a driver torque request. The engine 12 is unfueled and not spinning when in the OFF state. The autostart operation includes commanding the engine 12 to an ON state during key-on operation. When the engine 12 is in the ON state, torque for vehicle propulsion may be provided via the engine and one or both of the first and second electric machines 20, 22 in response to the driver torque request in one embodiment. Alternatively, when the engine 12 is in the ON state, the torque for vehicle propulsion may be provided via one of the first and second electric machines 20, 22 in response to the driver torque request and the engine 12 may provide torque to the other of the first and second electric machines 20, 22 to generate electric power for storage in the battery 13 and to generate torque for vehicle propulsion through the one of the first and second electric machines 20, 22 that is configured to generate the torque for vehicle propulsion.

The transmission 14 includes first and second planetary gear sets 40, 50, respectively, having elements that rotatably couple to the first and second electric machines 20, 22, respectively. Planetary gear set 40 includes sun gear 42, carrier member 44 and ring gear 48. The carrier member 44 rotatably supports a plurality of pinion gears 46 that mesh with the sun gear 42, and the ring gear 48 meshes with the pinion gears 46. Planetary gear set 50 includes sun gear 52, carrier member 54 that rotatably supports a plurality of pinion gears 56 that mesh with the sun gear 52, and the ring gear 58 meshes with the pinion gears 56. Rotor hub 35 rotates in concert with the sun gear 52 through an intermediate sleeve shaft 64. In one embodiment and as described herein, the transmission 14 is an electro-mechanical transmission device wherein the first and second electric machines 20, 22 are electrically powered motor/generators. It is appreciated that the concepts described herein are not limited to transmissions employing only first and second simple planetary gear sets, but may also advantageously apply to transmissions employing any plurality of simple or complex planetary gear sets or other gear train configurations.

The first electric machine 20 and the second electric machine 22 are packaged within a case housing/ground 24 and rotatably couple between the input member 16 and the transmission output member 26 that couples to the driveline 90. The first electric machine 20 includes an annular stator 30 grounded to the transmission casing 24 and an annular rotor 32 supported on a rotatable rotor hub 34. The second electric machine 22 includes an annular stator 31 grounded to the transmission casing 24 and an annular rotor 33 supported on a rotatable rotor hub 35.

The battery 13 supplies electric power to a power inverter 17 that electrically connects with the first stator 30 via transfer conductors 41 to control operation thereof. The battery 13 may be any high-voltage electrical energy storage device, including those employing lithium-ion cells or other suitable electrochemical devices. Power output of the battery 13 may be characterized in terms of voltage, current and state of charge (SOC). The SOC provides an indication of stored electrical energy on the battery 13, e.g., in units of A-h or other suitable units, and may be determined by any suitable method such as current integration. The battery 13 is preferably characterized in terms of a minimum SOC and a maximum SOC. Operations that cause the battery 13 to exceed the maximum SOC or fall below the minimum SOC may cause physical and chemical changes in the battery 13 that may reduce its service life, and are thus undesirable.

The power inverter 17 also electrically connects with the second stator 31 via transfer conductors 43 to control operation of the second electric machine 22 to control operation. The first and second electric machines 20, 22 may operate as motors or generators. Either of the first and second electric machines 20, 22 may operate as an electric motor in which stored electrical power provided by the battery 13 is converted by the power inverter 17 and provided to the respective stator 30, 31 to generate torque. Either of the first and second electric machines 20, 22 may operate as an electric generator in which vehicle momentum may be converted to electrical power stored in the battery 13 or used by the second electric machine 27.

The transmission 14 further includes a first clutch 51 and a second clutch 53. The first clutch 51 is a grounding clutch or brake that is selectively activated to ground the ring gear member 58 to the transmission casing 24. The input member 16 is axially spaced from and not concentric with shaft 60, which couples the carrier member 44 of the first planetary gear set 40 and the carrier member 54 of the second planetary gear set 50. Shaft 72 is preferably coaxial with the input member 16, which couples to hub member 70 to couple with the input member 16 for common rotation with the ring gear 48. Shaft 62 couples rotor hub 34 with sun gear 42 via hub member 37 and an axially-extending portion 39. The second clutch 53 nests between an axially extending portion 39, hub 37 and shaft 62. A hub member 77 couples with the second clutch 53. A separate sleeve shaft 60 concentric with shaft 62 couples carrier member 54 and hub members 68 and 69 to carrier member 44, and thus fixedly couples rotation of the carrier member 44 to rotation of the carrier member 54. Sleeve shaft 64 couples rotor hub 35 with sun gear 52. Axially-extending member 78, hub 77 and axially-extending member 79, which is an annular shaft, couple the second clutch 53 with the first clutch 51 and ring gear 58. The axially-extending member 78 further circumscribes the planetary gear set 50. The ring gear member 58 decouples from the sun gear member 42 when the second clutch 53 is deactivated.

The transmission 14 selectively operates in fixed-gear modes and variable modes, with the variable modes being electrically-variable modes in one embodiment. Transmission operation in a fixed-gear mode includes any operation wherein the rotational speed of the output member 26 is a direct ratio of the rotational speed of the input member 16. The transmission 14 operates in one fixed-gear mode at a first gear ratio by activating both the first and second clutches 51, 53. The transmission 14 operates in an engine-off fixed-gear mode at a second gear ratio by activating the first clutch 51 in combination with the engine 12 being in an OFF state under conditions as described herein. The first gear ratio and the second gear ratio may be determined based upon the gear ratios of the first and second planetary gear sets 40, 50. Transmission operation in one of the variable modes includes any operating condition wherein the rotational speed of the output member 26 is determined based upon the speed of the input member 16 in combination with rotational speeds of the first and second electric machines 20, 22, the gear ratios of the planetary gear sets 40, 50, activation states of the first and second clutches 51, 53 and other factors.

The HCP 5 communicates with an engine control module (ECM) 23, the inverter controller 15, and a transmission control module (TCM) 21, along with other devices. The HCP 5 provides supervisory control over the ECM 23, the TCM 21, the inverter controller 15 and an operator interface device 6 that receives commands from a vehicle operator. The HCP 5 coordinates torque commands between the engine 12 and the first and second electric machines 20, 22 to control output torque in response to the driver torque request that is input to the operator interface device 6. The operator interface device 6 includes one or a plurality of devices through which the operator commands operation of the vehicle and powertrain system, including, e.g., an accelerator pedal, a brake pedal, an ignition key, a transmission range selector, a charge mode selector, a cruise control actuator, and other related devices. The operator interface device 6 generates commands for operating the vehicle, including, e.g., a vehicle key-on/key-off state, a transmission range selection, e.g., one of Park, Reverse, Neutral and Drive, the driver torque request, a selected charge mode, and other related commands. The powertrain system 10 generates an output torque that is delivered through the driveline 90 as propulsion torque to the vehicle wheels in response to the driver torque request and other inputs to the operator interface device 6. The operator interface device 6 is shown as a unitary device for ease of illustration.

The power inverter module 17 preferably includes a pair of power inverters and respective motor control modules configured to receive torque commands and control inverter states therefrom for providing motor drive or electric power regeneration functionality to meet the motor torque commands. The power inverters include complementary three-phase power electronics devices, and each includes a plurality of insulated gate bipolar transistors (IGBTs) or other suitable power switching devices for converting DC power from the battery 13 to AC power for powering respective ones of the first and second electric machines 20, 22 by switching at high frequencies. The IGBTs form a switch mode power supply configured to receive control commands. Each phase of each of the three-phase electric machines includes a pair of IGBTs. States of the IGBTs are controlled to provide motor drive mechanical power generation or electric power regeneration functionality. The three-phase inverters receive or supply DC electric power via DC transfer conductors and transform it to or from three-phase AC power, which is conducted to or from the first and second electric machines 20, 22 for operation as motors or generators via transfer conductors. The inverter controller 15 controls the power inverter module 17 to transfer electrical power to and from the first and second electric machines 20, 22 in response to the motor torque commands. Electrical current is transferred across the high-voltage electrical bus to and from the battery 13 to charge and discharge the battery 13.

The ECM 23 operatively connects to the engine 12, and functions to acquire data from sensors and send actuator commands to the engine 12 over a plurality of discrete lines or other suitable communication links. The ECM 23 monitors engine speed and load, which are communicated to the HCP 5. The inverter controller 15 monitors and controls a first motor torque of the first electric machine 20 and a second motor torque of the second electric machine 22. Alternatively, two electronic controllers can be utilized, with each controller monitoring respective ones of the first and second electric machines 20, 22, respectively. The TCM 21 monitors rotational speeds and controls activation and deactivation of the first and second clutches 51, 53. Other sensors, actuators and control routines not directly related to the present disclosure are not detailed or described.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be executed at regular intervals, for example each 100 microseconds or 3.125, 6.25, 12.5, 25 and 100 milliseconds during ongoing operation. Alternatively, routines may be executed in response to occurrence of a triggering event. Communications between controllers, and communications between controllers, actuators and/or sensors may be accomplished using a direct wired link, a networked communications bus link, a wireless link or any another suitable communications link. Communications includes exchanging data signals in any suitable form, including, for example, electrical signals via a conductive medium, electromagnetic signals via air, optical signals via optical waveguides, and the like. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Figure 2:
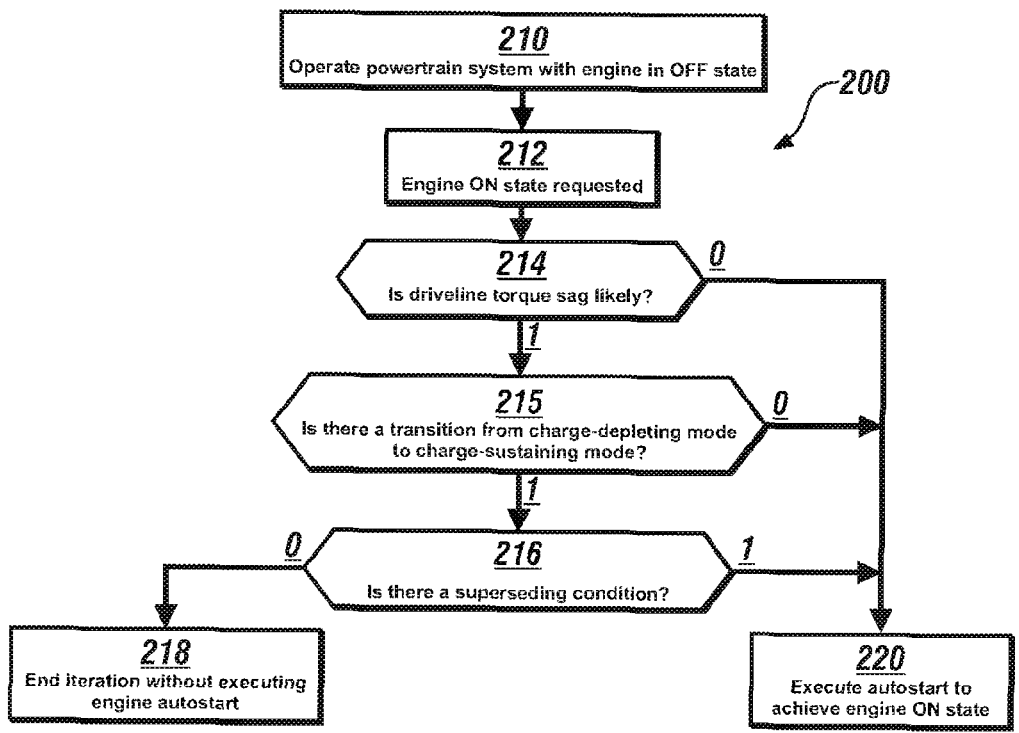
FIG. 2 schematically illustrates a flowchart for an engine autostart control routine that may be periodically executed to control operation of an embodiment of the powertrain system described with reference to FIG. 1, in accordance with the disclosure.

FIG. 2 schematically shows a flowchart for an engine autostart control routine 200 that may be periodically executed to control operation of an embodiment of the powertrain system 10 described hereinabove with reference to FIG. 1 as one or a plurality of routines that are executed in the HCP 5 and/or others of the controllers. The powertrain system 10 is described in context of providing propulsion torque to vehicle wheels through the driveline 90 for an exemplary vehicle in response to an operator request for power, which is also referred to herein as the driver torque request. The engine autostart control routine 200 is executed to control operation of the powertrain system 10, which generates an output torque that is delivered to the driveline 90 for propulsion torque effort. As such, the output torque of the powertrain system 10 relates to the propulsion torque through the driveline 90. The engine autostart control routine 200 includes determining whether a driveline torque sag may occur during execution of the engine autostart operation in response to a request to execute an engine autostart operation, and forgoing executing the engine autostart operation when it is determined that a driveline torque sag is likely to occur if the engine autostart operation is executed. The engine autostart control routine 200 preferably periodically executes during vehicle operation, e.g., once every 12.5 ms. Table 1 is provided as a key wherein the numerically labeled blocks and the corresponding functions are set forth as follows, corresponding to the engine autostart control routine 200.

TABLE 1

| BLOCK | BLOCK CONTENTS |
| --- | --- |
| 210 | Operate powertrain system with engine in OFF state |
| 212 | Engine ON state requested |
| 214 | Is driveline torque sag likely? |
| 215 | Is there a transition from charge-depleting mode to charge-sustaining mode? |
| 216 | Is there a superseding condition? |
| 218 | End iteration without executing engine autostart |
| 220 | Execute autostart to achieve engine ON state |

During vehicle operation, the powertrain system 10 may be operating with the engine 12 in the OFF state, such as during operation in a charge-depleting mode (210). The powertrain system 10 may request the engine 12 to transition to the ON state, under conditions that may include when battery SOC decreases to a first minimum SOC threshold (212).

Before executing an autostart operation, the engine autostart control routine 200 determines whether a driveline torque sag or another undesirable drivability condition is likely to occur during the autostart operation (214). This preferably includes determining a driver torque request, a maximum torque capability of the electric machine and an engine starting torque. A driveline torque sag is a condition wherein propulsion torque to the vehicle driveline 90 decreases unexpectedly, i.e., decreases without a corresponding decrease in the driver torque request. Thus, it may be determined whether a driveline torque sag will occur during execution of an engine autostart operation based upon a comparison between the engine starting torque and a difference between the maximum torque capability of the electric machine and the driver torque request. One vehicle operating condition under which a driveline torque sag is likely to occur during an autostart operation includes operating the powertrain system 10 in a charge-depleting mode wherein the driver torque request is at a magnitude that demands a substantial portion of the maximum torque capability of the electric machine that is generating the torque for vehicle propulsion. By way of example, a driveline torque sag is likely to occur when the maximum torque capability of the second electric machine 22 is less than a combination of the driver torque request and the engine starting torque, taking into account the selected range of the transmission 14 and the torque transfer elements of the driveline 90. Stated otherwise, a driveline torque sag is likely to occur during execution of the engine autostart operation when the engine starting torque is greater than a difference between the maximum torque capability of the electric machine and the driver torque request. Engine starting torque is that amount of torque necessary to spin the engine 12 in an unfueled condition to achieve a desired speed for engine starting. As such, the engine autostart control routine 200 may delay execution of an autostart operation when the battery SOC decreases to less than the first minimum SOC threshold to avoid driveline torque sag that may be caused thusly.

When conditions of the powertrain operation indicate that a driveline torque sag is unlikely to occur, i.e., when the maximum torque capability of the second electric machine 22 is substantially greater than a combination of the driver torque request and engine starting torque (214)(0), the engine autostart operation is executed without delay (220). Thus, the engine autostart operation may execute without delay in response to a driver tip-out event, e.g., when the driver torque request changes and thus no longer demands a substantial portion of the maximum torque capability of the electric machine that is generating the torque for vehicle propulsion.

When conditions of the powertrain operation indicate that a driveline torque sag may occur, i.e., when the maximum torque capability of the second electric machine 22 is less than or equal to a combination of the driver torque request and engine starting torque (214)(1), the engine autostart control routine 200 evaluates whether there has been a transition from the charge-depleting mode to the charge-sustaining mode (215). When there has not been a transition from the charge-depleting mode to the charge-sustaining mode (215)(0), the engine autostart operation is executed without delay (220). When there has been a transition from the charge-depleting mode to the charge-sustaining mode (215)(1), the engine autostart control routine 200 evaluates whether there are superseding conditions that compel execution of the engine autostart operation regardless of the likelihood of a driveline torque sag (216). The engine autostart control routine 200 may delay execution of the autostart operation when the battery SOC decreases to less than the first minimum SOC threshold to avoid driveline torque sag during such evaluation. One superseding condition that may compel execution of the engine autostart operation includes executing the engine autostart operation when the battery SOC decreases to a second minimum SOC threshold that is less than the first minimum threshold to avoid certain operating conditions, e.g., low battery SOC that may result in decreased battery life. Another superseding condition that may compel execution of the engine autostart operation includes executing the engine autostart operation when a delta SOC state falls outside a preferred range. A delta SOC state indicates a magnitude of variation from a target SOC state, preferably in terms of SOC (%). In one embodiment, the delta SOC state may be employed in battery management to control the SOC along with the target SOC. By way of example, a target SOC may be at 20% SOC with a delta SOC of ±5%. Thus, an engine autostart operation may be executed regardless of likelihood of driveline torque sag when the actual SOC is less than the target SOC combined with the delta SOC. Another superseding condition that may compel execution of the engine autostart operation includes executing the engine autostart operation when operating with the engine 12 in the OFF state is no longer available due to a hardware fault or another limitation. Another superseding condition that may compel execution of the engine autostart operation includes executing the engine autostart operation when an engine ON request has been active for a period of time greater than a threshold. The engine ON request and associated execution of the autostart operation may be cancelled if the engine OFF state is requested during the evaluation. When any of the superseding conditions that compel execution of the autostart operation are met (216)(1), the engine autostart operation is executed without delay (220).

When none of the superseding conditions that compel execution of the autostart operation are met (216)(0), the engine autostart control routine 200 ends, thus forgoing executing the autostart operation during the present iteration (218). Such operation may extend operation in the engine OFF state or operation in the EV mode in response to high driver torque requests, and reduces likelihood of undesired drivability conditions associated with engine autostart operations.

Figure 3:
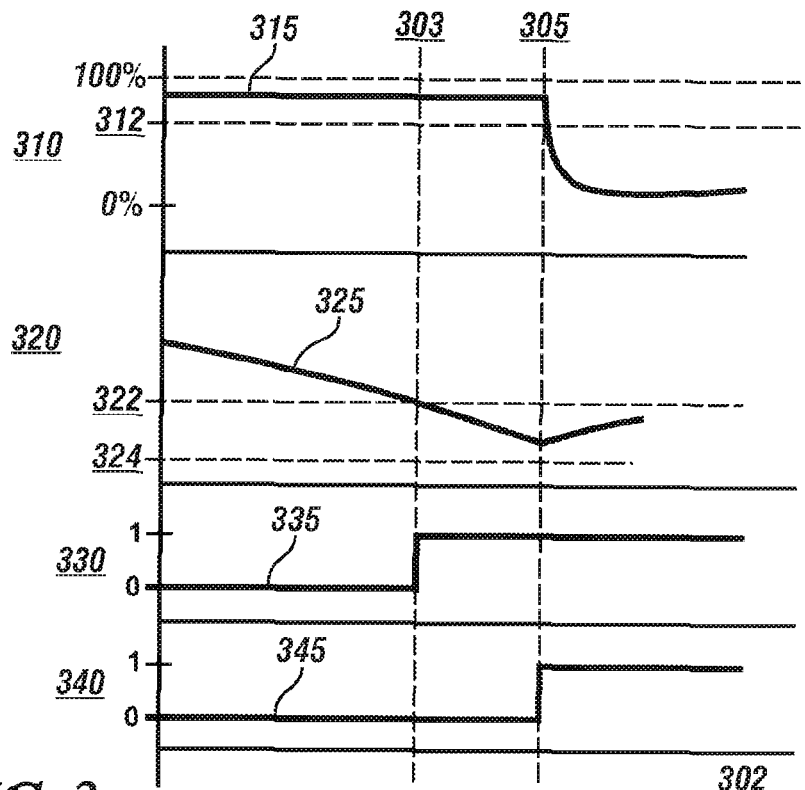
FIG. 3 graphically illustrates operation of an embodiment of the powertrain system described with reference to FIG. 1 employing an embodiment of the engine autostart control routine described with reference to FIG. 2, in accordance with the disclosure.

FIG. 3 graphically shows operation of an embodiment of the powertrain system 10 described with reference to FIG. 1 employing an embodiment of the engine autostart control routine 200 described with reference to FIG. 2. The graph includes parameters including driver torque request (%) 310, SOC 320, an engine ON request 330 and an engine autostart operation 340 on the vertical axes in relation to time 302 on the horizontal axis. Plotted data includes driver torque request 315, SOC 325, engine ON request 335, and autostart request 345.

Initially the engine ON request 335 and the autostart request 345 are both inactive (0), indicating the engine is in the OFF state, and thus the powertrain is operating in a charge-depleting mode, as indicated by a decrease in the SOC 325. The driver torque request 315 is initially greater than a threshold request 312, wherein the threshold request 312 corresponds to a magnitude for the driver torque request at which a substantial portion of the maximum torque capability of the electric machine is generating the torque for vehicle propulsion. Executing the autostart operation may cause a driveline torque sag when the driver torque request 315 is greater than the threshold request 312.

At timepoint 303, the SOC 325 reaches a first minimum SOC threshold 322. The first minimum SOC threshold 322 may be associated with an SOC level at which the system requests a transition from a charge-depleting mode to a charge-sustaining mode, and is preferably greater than a minimum allowable SOC level 324. Thus, the engine ON request 330 transitions to active (1). However, the engine autostart operation 340 remains inactive (0) because the driver torque request 315 is greater than the threshold request 312, indicating a likelihood of occurrence of a sag during the autostart operation.

Operation continues, and at timepoint 305, the driver torque request 315 decreases to the threshold request 312. Such operation enables the engine autostart execution 340 to become active (1) coincident with the engine ON request 330 remaining active (1). Thus, the engine autostart operation 340 executes, and the engine 12 provides power to the first electric machine 20 to generate electric power, as evidenced by the corresponding increase in the SOC 325 thereafter. It is also notable that the engine autostart execution 340 would have been triggered had the SOC 325 reached the minimum allowable SOC level 324.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for controlling a powertrain system that includes an internal combustion engine, an electric machine configured to generate propulsion torque responsive to a driver torque request and an energy storage device electrically connected to the electric machine, the method comprising:
   requesting execution of an engine autostart operation;
   evaluating, via a controller, whether a driveline torque sag will occur during the execution of the engine autostart operation prior to the engine autostart operation;
      forgoing via the controller the execution of the engine autostart operation when the driveline torque sag will occur during execution of the engine autostart operation unless a superseding condition compels the execution of the engine autostart operation; and
   executing via the controller the engine autostart operation upon occurrence of the superseding condition;
   wherein the superseding condition is associated with a state of charge (SOC) of the energy storage device; and
   wherein the driveline torque sag comprises a decrease in the propulsion torque without a corresponding decrease in the driver torque request.

2. The method of claim 1, wherein evaluating whether the driveline torque sag will occur during execution of the engine autostart operation comprises:
   determining, via the controller, the driver torque request, a maximum torque capability of the electric machine and an engine starting torque; and
   determining the propulsion torque based upon a comparison between the engine starting torque and a difference between the maximum torque capability of the electric machine and the driver torque request.

3. The method of claim 1, further comprising
   executing the engine autostart operation when the SOC reaches the minimum allowable SOC level, wherein the superseding condition compelling the execution of the engine autostart operation comprises the SOC being equal to the minimum allowable SOC level.

4. The method of claim 1, further comprising:
   determining a target SOC state and a delta SOC state for the energy storage device; and
   executing the engine autostart operation when the SOC is less than the target SOC combined with the delta SOC state, wherein the superseding condition compelling the execution of the engine autostart operation comprises the SOC being less than the target SOC combined with the delta SOC state.

5. The method of claim 1, further comprising executing the engine autostart operation when an engine OFF state is no longer permissible, wherein the superseding condition compelling the execution of the engine autostart operation comprises the engine OFF state being no longer permissible due to occurrence of a hardware fault.

6. The method of claim 1, further comprising executing the engine autostart operation when an engine ON request has been active for a period of time greater than a threshold, wherein the superseding condition compelling the execution of the engine autostart operation comprises the engine ON state being active for a period of time greater than a threshold.

7. A method for controlling a powertrain system for a vehicle that includes an internal combustion engine and an electric machine configured to generate propulsion torque and electric power storable on an energy storage device, wherein a maximum torque capability of the electric machine is greater than a maximum torque capability of the internal combustion engine, the method comprising:
  requesting execution of an engine autostart operation during operation in a charge depletion mode;
  evaluating, via a controller, whether a driveline torque sag will occur during the execution of the engine autostart operation prior to the engine autostart operation;
    forgoing via the controller the execution of the engine autostart operation when the driveline torque sag will occur if the engine autostart operation is executed unless a superseding condition compels the execution of the engine autostart operation; and
  executing via the controller the engine autostart operation upon occurrence of the superseding condition;
  wherein the superseding condition is associated with a state of charge (SOC) of the energy storage device; and
  wherein the driveline torque sag comprises a decrease in the propulsion torque without a corresponding decrease in the driver torque request.

8. The method of claim 7, wherein evaluating whether the driveline torque sag will occur during execution of the engine autostart operation comprises:
  determining, via the controller, the driver torque request, a maximum torque capability of the electric machine and an engine starting torque; and
  determining the propulsion torque based upon a comparison between the engine starting torque and a difference between the maximum torque capability of the electric machine and the driver torque request.

9. The method of claim 7, further comprising; and
  executing the engine autostart operation when the SOC reaches the minimum allowable SOC level.

10. The method of claim 7, further comprising:
  determining a target SOC state and a delta SOC state for the energy storage device; and
  executing the engine autostart operation when the SOC is less than the target SOC combined with the delta SOC state.

11. The method of claim 7, further comprising executing the engine autostart operation when an engine OFF state is no longer permissible due to occurrence of a hardware fault.

12. The method of claim 7, further comprising executing the engine autostart operation when an engine ON request has been active for a period of time greater than a threshold.

13. A powertrain system, comprising:
  an internal combustion engine and an electric machine mechanically coupled to a transmission to transfer torque to a driveline;
  an energy storage device electrically connected to the electric machine; and
  a controller including a control routine in response to a, the control routine including executable code operative to:
    request execution of an engine autostart operation during powertrain operation in a charge depletion mode;
    evaluate whether a driveline torque sag will occur during execution of the engine autostart operation prior to the engine autostart operation;
      forgo the execution of the engine autostart operation when the driveline torque sag will occur during execution of the engine autostart operation unless a superseding condition compels the execution of the engine autostart operation; and
    execute the engine autostart operation upon occurrence of the superseding condition;
    wherein the superseding condition is associated with a state of charge (SOC) of the energy storage device; and
    wherein the driveline torque sag comprises a decrease in the propulsion torque without a corresponding decrease in the driver torque request.

14. The powertrain system of claim 13, wherein the executable code operative to evaluate whether the driveline torque sag will occur during execution of the engine autostart operation comprises executable code operative to:
  determine a driver torque request, a maximum torque capability of the electric machine and an engine starting torque; and
  determine the propulsion torque based upon a comparison between the engine starting torque and a difference between the maximum torque capability of the electric machine and the driver torque request.

15. The powertrain system of claim 13, further comprising the control routine including executable code operative to:
  execute the engine autostart operation when the SOC reaches the minimum allowable SOC level, wherein the superseding condition compelling the execution of the engine autostart operation comprises the SOC being equal to the minimum allowable SOC level.

16. The powertrain system of claim 13, further comprising the control routine including executable code operative to:
  determine a target SOC state and a delta SOC, state for the energy storage device; and
  execute the engine autostart operation when the SOC is less than the target SOC combined with the delta SOC state, wherein the superseding condition compelling the execution of the engine autostart operation comprises the SOC being less than the target SOC combined with the delta SOC state.

17. The powertrain system of claim 13, further comprising the control routine including executable code operative to execute the engine autostart operation when an engine OFF state is no longer permissible, wherein the superseding condition compelling the execution of the engine autostart operation comprises the engine OFF state being no longer permissible due occurrence to a hardware fault.

18. The powertrain system of claim 13, further comprising the control routine including executable code operative to execute the engine autostart operation when an engine ON request has been active for a period of time greater than a threshold, wherein the superseding condition compelling the execution of the engine autostart operation comprises the engine ON state being active for a period of time greater than a threshold.

\* \* \* \* \*

UNITED STATES PATENT AND TRADEMARK OFFICE
CERTIFICATE OF CORRECTION

PATENT NO. : 9,810,190 B2
APPLICATION NO. : 14/694529
DATED : November 7, 2017
INVENTOR(S) : Meng Wang et al.

Page 1 of 1

It is certified that error appears in the above-identified patent and that said Letters Patent is hereby corrected as shown below:

In the Claims

Column 12, Line 47, in Claim 16 reading:
determine a target SOC state and a delta SOC"," state for the energy storage device; and,
Should read:
determine a target SOC state and a delta SOC state for the energy storage device; and, Signed and Sealed this
Sixth Day of March, 2018

Andrei Iancu
*Director of the United States Patent and Trademark Office*